(12) United States Patent
Chen et al.

(10) Patent No.: US 10,279,396 B2
(45) Date of Patent: May 7, 2019

(54) MACHINING TOOLHOLDER

(71) Applicant: NATIONAL CHUNG HSING UNIVERSITY, Taichung (TW)

(72) Inventors: Jenq-Shyong Chen, Taichung (TW); Hao-Tang Wang, Taichung (TW)

(73) Assignee: NATIONAL CHUNG HSING UNIVERSITY, Taichung (TW)

( * ) Notice: Subject to any disclaimer, the term of this patent is extended or adjusted under 35 U.S.C. 154(b) by 0 days.

(21) Appl. No.: 15/810,978

(22) Filed: Nov. 13, 2017

(65) Prior Publication Data

US 2018/0281081 A1 Oct. 4, 2018

(30) Foreign Application Priority Data

Mar. 29, 2017 (TW) .............................. 106110519 A

(51) Int. Cl.
| | | |
|---|---|---|
| B23B 29/12 | (2006.01) | |
| B23B 37/00 | (2006.01) | |
| B24B 45/00 | (2006.01) | |
| B24B 55/02 | (2006.01) | |
| B24D 5/10 | (2006.01) | |
| B24D 5/16 | (2006.01) | |
| B24B 1/04 | (2006.01) | |
| H02N 2/00 | (2006.01) | |
| B23B 31/08 | (2006.01) | |

(52) U.S. Cl.
CPC ............ *B23B 29/125* (2013.01); *B23B 37/00* (2013.01); *B24B 1/04* (2013.01); *B24B 45/00* (2013.01); *B24B 55/02* (2013.01); *B24D 5/10* (2013.01); *B24D 5/16* (2013.01); *H02N 2/0035* (2013.01); *B23B 31/08* (2013.01); *B23B 2231/24* (2013.01); *B23B 2260/108* (2013.01)

(58) Field of Classification Search
CPC ................ H02N 2/0035; B23B 29/125; B23B 2231/24; B23B 2260/108; B23B 2270/10
See application file for complete search history.

(56) References Cited

U.S. PATENT DOCUMENTS

2012/0107062 A1 5/2012 Moraru

FOREIGN PATENT DOCUMENTS

| CN | 1984738 A | 6/2007 |
|---|---|---|
| CN | 100479957 C | 4/2009 |
| CN | 102151867 B | 5/2013 |
| CN | 203018770 U | 6/2013 |
| CN | 104002205 A | 8/2014 |
| CN | 103683536 B | 7/2015 |

(Continued)

*Primary Examiner* — Alan Snyder
(74) *Attorney, Agent, or Firm* — Muncy, Geissler, Olds & Lowe, P.C.

(57) ABSTRACT

A machining toolholder including a body, a horn and a piezoelectric actuator is disclosed. The body includes a center through hole extending in the axial direction therein. The center through hole includes a first hole section and a second hole section. The horn includes a first section and a second section which are disposed coaxially and connected with each other. Part of the first section is slidably inserted into the first hole section. The second section is connected to the body and engaged with a tool. Part of the surface of the second section contacts with a wall surface of the second hole section. The piezoelectric actuator fits around the horn and is controllable to drive the tool to vibrate. With this design, the machining toolholder could have good stiffness and connection stability, and could resist to the stress effectively.

11 Claims, 7 Drawing Sheets

(56) References Cited

FOREIGN PATENT DOCUMENTS

| | | |
|---|---|---|
| CN | 104759400 A | 7/2015 |
| CN | 104842203 A | 8/2015 |
| CN | 105171131 A | 12/2015 |
| CN | 105246623 A | 1/2016 |
| CN | 104439348 B | 1/2017 |
| DE | 102009008227 A1 | 8/2010 |
| DE | 102015216596 A1 | 3/2017 |
| JP | H02109667 A | 4/1990 |
| JP | H0577145 A | 3/1993 |
| JP | 2001138185 A | 5/2001 |
| JP | 2002219606 A | 8/2002 |
| JP | 2008504138 A | 2/2008 |
| TW | 526122 B | 4/2003 |
| TW | 535688 U | 6/2003 |
| TW | 200302149 A | 8/2003 |
| TW | 200624219 A | 7/2006 |
| WO | 2010091821 A1 | 8/2010 |
| WO | 2016037046 A1 | 3/2016 |

MACHINING TOOLHOLDER

BACKGROUND OF THE INVENTION

1. Technical Field

The present invention generally relates to a machining toolholder, and more particularly to a machining toolholder with vibration assisted machining function.

2. Description of Related Art

A conventional processing device with vibration assisted machining function, such as a rotary type ultrasonic vibration assisted machining device, which is provided with a piezoelectric actuator and a horn on a body to be installed on a high-speed rotating spindle, and the rotation of the spindle would drive the body to rotate together. Wherein, the vibration generated by the piezoelectric actuator, can be amplified by the horn and then transmitted to the tool, whereby the tool can cut in a high-speed rotation with vibration. By changing the continuous contact processing into a reciprocating intermittent contact processing, the workpiece can obtain a high-precision smooth surface through the additional vibration processing.

It has been proved that the rotary type ultrasonic vibration assisted machining device is suitable for high hardness, high toughness or brittle materials, which can effectively improve the surface quality of the workpiece and reduce the surface roughness of the processing workpiece after processing. However, it is known that the rotary type ultrasonic vibration assisted machining device still has the following drawbacks:

First, the conventional horn simply utilizes a top surface thereof to engage with the bottom of the body. When the horn and the body are driven by the spindle to rotate in the processing process, the connection between the horn and the body is unstable and a rotation bias occurs easily, which cause the tool to tilt, and the processing precision of the workpiece to be lowered.

Second, based on the application purpose, the conventional spindle is usually provided with a ceramic bearing. However, the ceramic bearing has less strength than the spindle. When the vibration generated by the piezoelectric actuator is transmitted to the spindle through the horn, the amplified vibration generally results in cracking of the ceramic bearing. Additionally, the conventional piezoelectric actuator is usually installed on the horn to amplify the vibration thereof. However, according to the conventional design, the stress is accumulated on the joint between the body and the horn. After bearing a long-time vibration, cracks are easily generated on the joint between the body and the horn, which results in a danger of the components being loose from the device.

Third, the conventional rotary type ultrasonic vibration assisted machining device is constituted by a plurality of mechanical components. In the assembling process of the machining device, such as assembling the horn, the piezoelectric actuator, or the tool, an assembling error accumulated by the mechanical components easily results in a rotation runout of the spindle and affects the processing quality of the workpiece with hard and brittle material.

Fourth, in the conventional rotary type ultrasonic vibration assisted machining device, the vibration antinode is located at the joint between the tool and the terminal end of the horn, i.e., the vibration has a maximum displacement at the joint. Such a configuration would cause the joint to bear a maximum friction force generated from the vibration, and thereby abrasion or deformation could be formed on the joint because of the friction force or the elevated temperature. As a result, at the processing end of the tool, the resonance frequency drifts and the amplitude are not stable, and the stability and quality of the processing are affected. Meanwhile, the lifetime of the tool is shortened.

In addition, in a general process of grinding a workpiece with hard and brittle material, it simply requires producing a small amplitude of 1 to 3 μm at the processing end of the tool to obtain an effective grinding result. However, in another process for the metal material, the composite material, or the aerospace material, such as Inconel, the Nickel-based alloy, or the Titanium alloy, it needs to utilize a high amplitude to perform the grinding process because of the high toughness and high strength of the material. However, it is difficult for the conventional rotary type ultrasonic vibration assisted machining device to provide the high amplitude as mentioned above.

BRIEF SUMMARY OF THE INVENTION

In view of the above, the purpose of the invention is to provide a machining toolholder which has good stiffness and combination stability so as to have an effective resistance to stress and increase a processing precision of a workpiece.

The present invention provides a machining toolholder adapted to be engaged with a tool, wherein the machining toolholder is provided on a spindle and is driven by the spindle to rotate. The machining toolholder includes a body, a horn and a piezoelectric actuator. The body includes a center through hole extended along an axial direction therein. The horn includes a first section and a second section, wherein the first section and the second section are disposed coaxially and connected with each other; the first section is partially inserted into the center through hole; the second section is connected to the body and engaged with the tool; part of the surfaces of the first section and the second section are respectively in contact with an inner surface of the center through hole, and the first section is slidably engaged with the body. The piezoelectric actuator is adapted to be fit around the horn and controllable to drive the tool to vibrate.

With the improvement on the structure of the machining toolholder, the advantage of the present invention is to provide a machining toolholder with good stiffness and connection stability, and could resist to the stress effectively, and thereby the processing precision of the workpiece would be increased.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
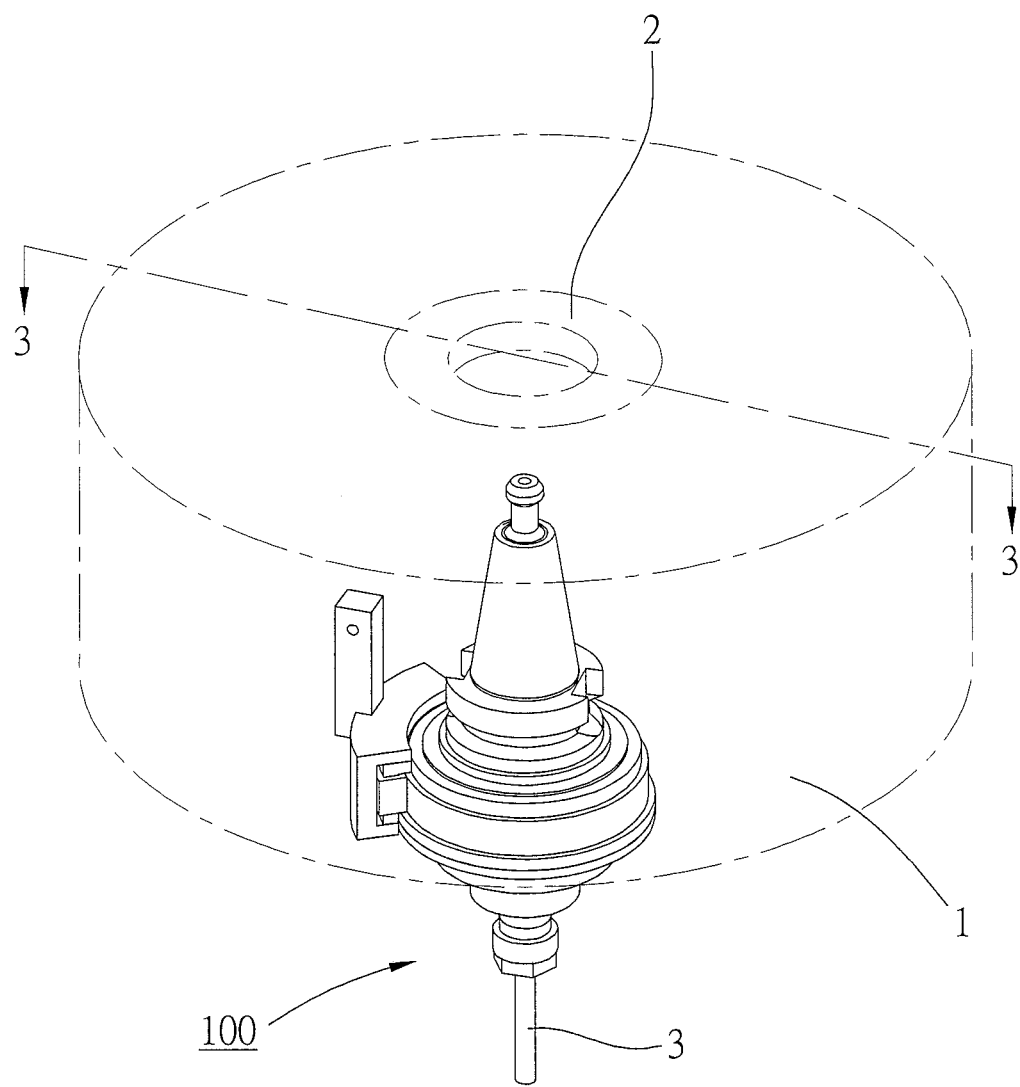
FIG. 1 is a perspective view of a machining toolholder of a first embodiment according to the present invention.
Figure 2:
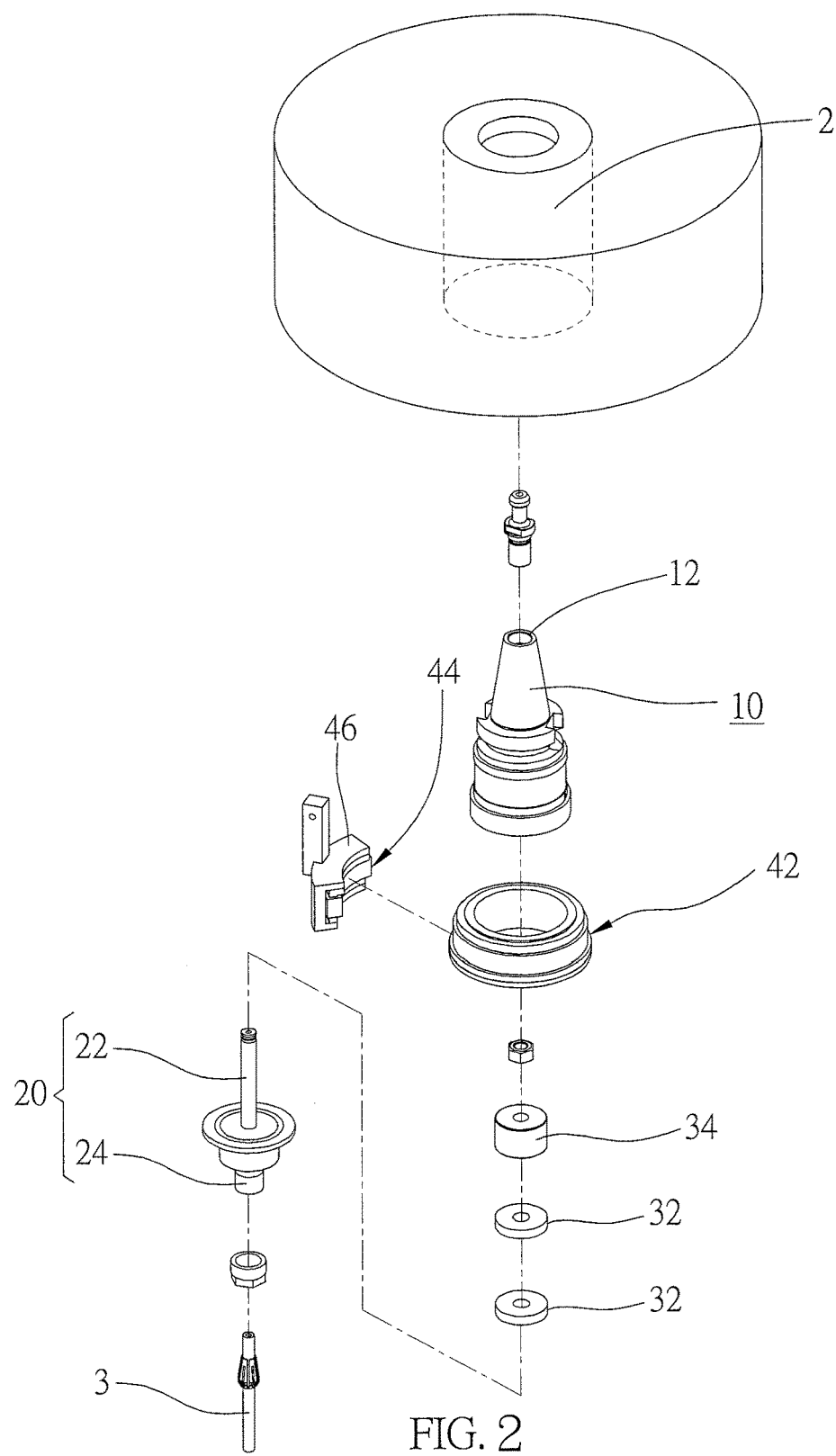
FIG. 2 is an exploded perspective view of the machining toolholder of the first embodiment according to the present invention.

The following illustrative embodiments and drawings are provided to illustrate the disclosure of the present invention, these and other advantages and effects can be clearly understood by persons skilled in the art after reading the disclosure of this specification. As shown in FIG. 1 and FIG. 2, a machining toolholder 100 of an embodiment according to the present invention is disclosed. The machining toolholder 100 is installed on a spindle 2 of a mount 1 and adapted to be engaged with a tool 3. The spindle 2 could be controllable to rotate and drive the machining toolholder 100 to rotate together.

Figure 3:
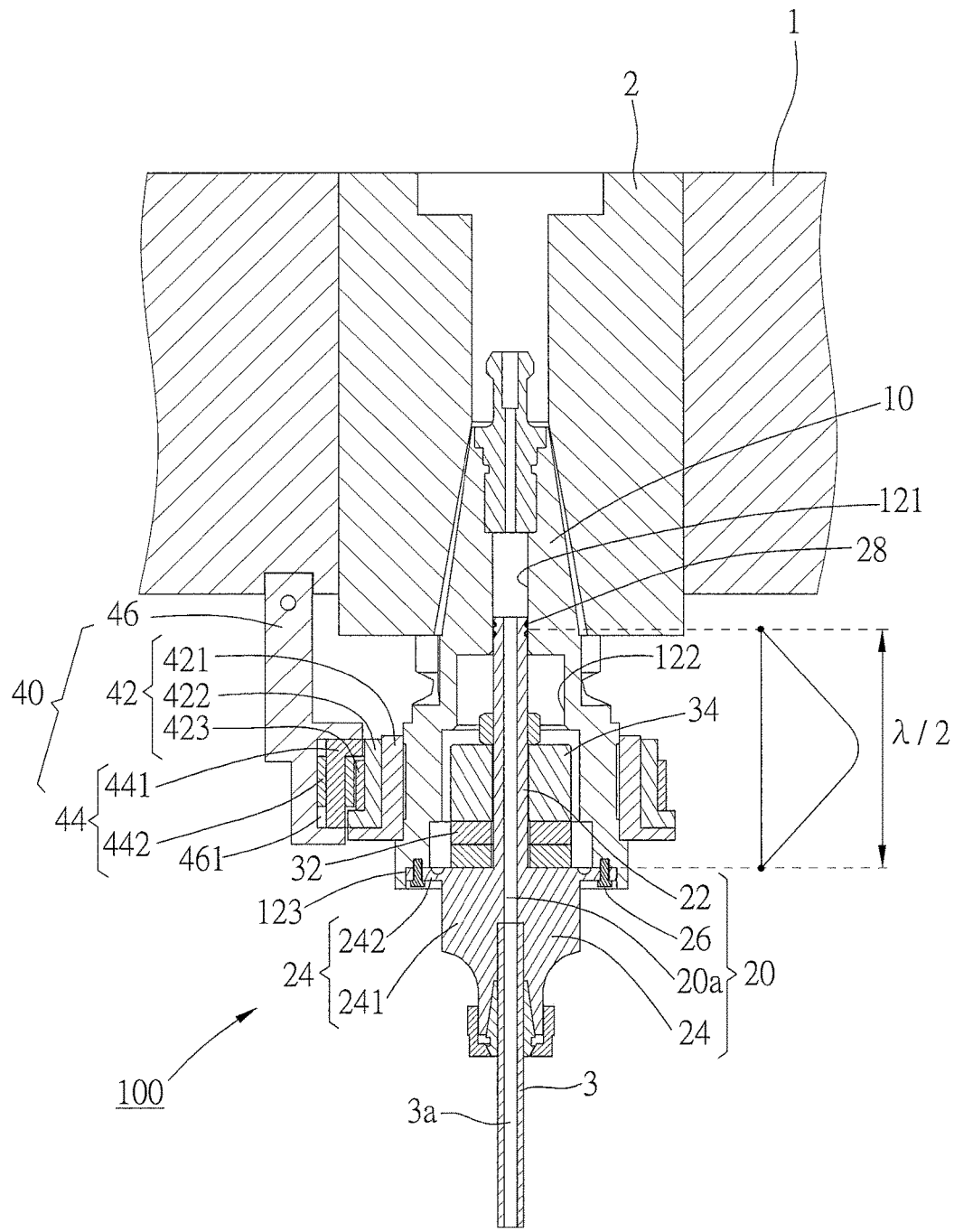
FIG. 3 is a sectional view along the line 3-3 of FIG. 1, showing the relations of the components of the machining toolholder.

The machining toolholder 100 includes a body 10, a horn 20, a piezoelectric actuator 32, a counter weight part 34 and an induction module 40. The body 10 is installed on the spindle 2 and includes a center through hole 12 extending axially therein. As shown in FIG. 2 and FIG. 3, in the current embodiment, the center through hole 12 includes multiple stages which are defined as, from top down, a first hole section 121, a stepping section 122 and a second hole section 123 which are communicated with one another. Wherein, the inner diameter of the first hole section 121 is smaller than the inner diameters of stepping section 122 and the second hole section 123, while the inner diameter of the stepping section 122 is smaller than that of the second hole section 123.

Figure 4:
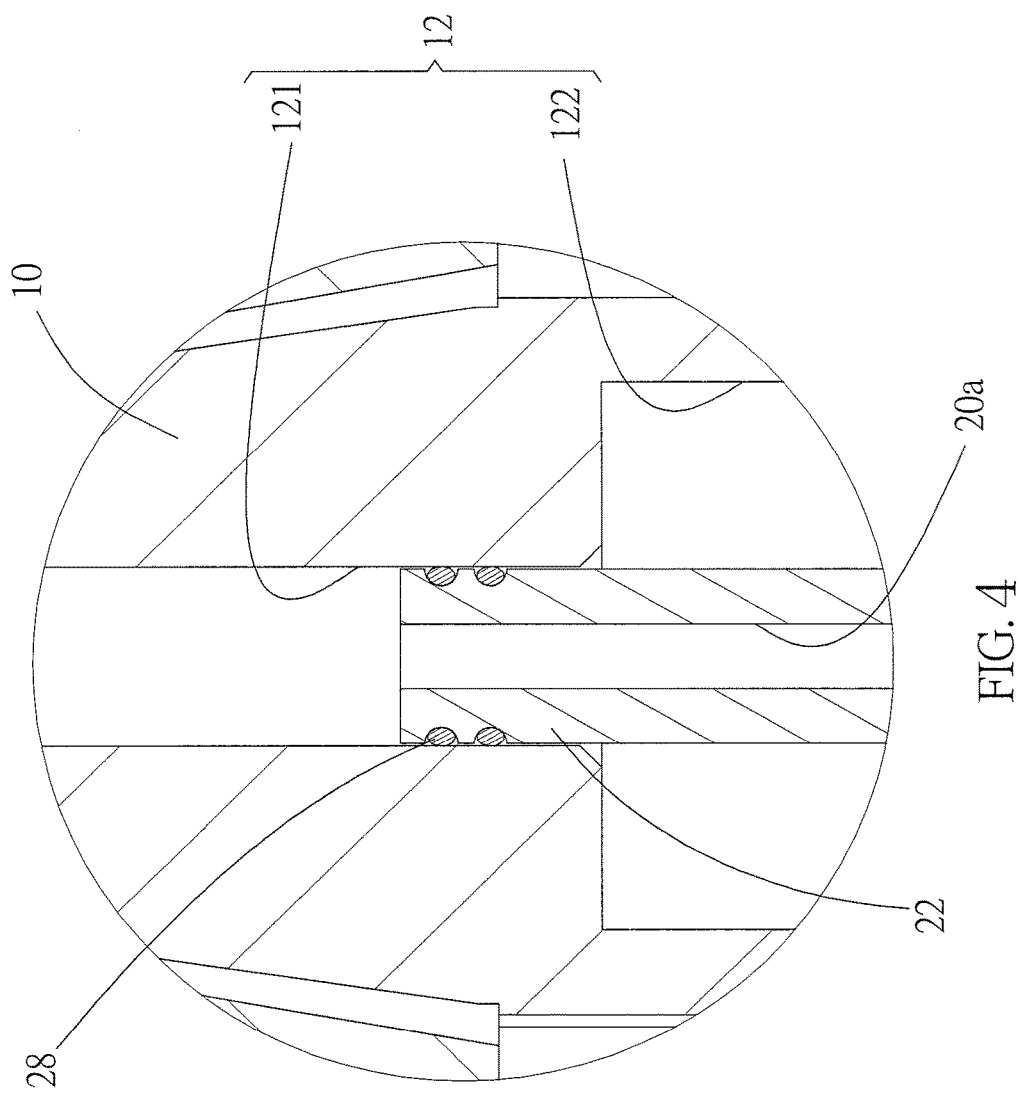
FIG. 4 is a sectional enlarged view illustrating that the first section of the horn is partially inserted into the center through hole with a detachable engaging manner.

The horn 20 includes a first section 22 and a second section 24, wherein the first section 22 and the second section 24 are disposed coaxially and connected with each other. As shown in FIG. 4, the first section 22 could be engaged with the body 10 as a sliding pair. That is, the first section 22 is partially inserted into the first hole section 121 of the center through hole 12 and in contact with the inner surface of the first hole section 121, and thereby the first section 22 is constrained by the inner surface of the first hole section 121 and can reciprocate along the first hole section 121, while the other part of the first section 22 is remained in the stepping section 122.

The second section 24 includes a first vibration amplitude-amplifying part 241 and a flange 242. One end of the first vibration amplitude-amplifying part 241 is connected to a terminal end of the first section 22, while another end thereof is adapted to be engaged with the tool 3. The outer surface of the first vibration amplitude-amplifying part 241 is configured to be tapering toward the end to be engaged with the tool 3. Such a configuration is to amplify the amplitude by changing the cross-section area of the horn 20. In the current embodiment, part of the outer surface of the first vibration amplitude-amplifying part 241 is a curved surface as an example. However, in other embodiments, part of the outer surface can be an inclined surface or a stepping surface.

Figure 5:
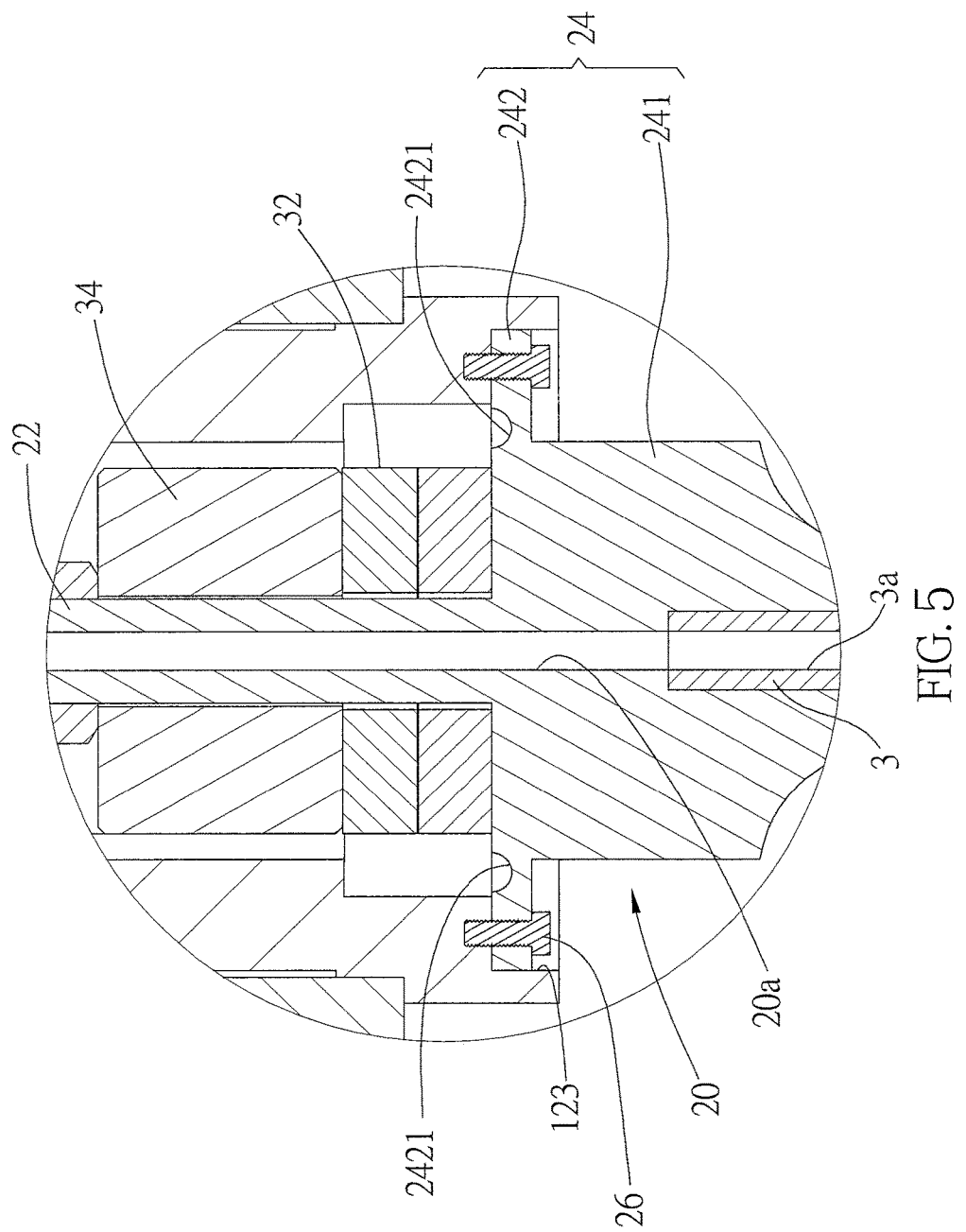
FIG. 5 is a sectional enlarged view illustrating that the second section of the horn is engaged with the body with the flange abutting against the wall surface of the second hole section of the center through hole.

As shown in FIG. 5, the flange 242 is extended outwardly from the outer surface of the first vibration amplitude-amplifying part 241 in a radial direction. Wherein, part of the flange 242 abuts against a wall surface of the second hole section 123 and is secured to the wall surface of the second hole section 123 via a bolt 26. In this way, with the flange 242 of the second section 24 abutting against the second hole section 123 and the first section 22 inserting into the first hole section 121, the horn 20 could be coaxially engaged with the body 10 in a spanning manner. Thereby, the stability of the connection between the horn 20 and the body 10 could be improved so as to ensure a processing quality of the tool 3. Also, the whole stiffness of the horn 20 can be improved such that the horn 20 could sustain bending stresses and lateral stresses, which can avoid the processing quality being affected by the rotation runout of the horn 20. In addition, in the current embodiment, the flange 242 is used as a positioning surface of the tool 3 so as to reduce the accumulated misalignment of the components.

The flange 242 includes a deformation part 2421, wherein the deformation part 2421 is located between one end of the flange 242 abutting against the wall surface of the second hole section 123 and the other end of the flange 242 connected to the first vibration amplitude-amplifying part 241. In the current embodiment, the deformation part 2421 is a ring-shaped groove recessed from the top surface of the flange 242. The deformation part 2421 and the wall surface of the second hole section 123 are in direct contact, which means the flange 242 could generate a flexural deformation at the deformation part 2421. In other words, when the horn 20 receives an external force, the deformation part 2421 could deform moderately to make the first section 22 and the first vibration amplitude-amplifying part 241 of the horn 20 reciprocate along the axial direction thereof and to prevent a cracking being generated on the joint between the flange 242 and the second hole section 123. In practice, in other embodiments, the deformation part 2421 also can be a groove recessed from the bottom surface of the flange 242 or a plurality of holes or slots formed on the flange 242, which could have a flexural deformation as well.

In addition, the horn 20 further includes a channel 20a extending from the first section 22 to the second section 24 in the axial direction. The tool 3 also includes a channel 3a axially disposed therein. The two ends of the channel 20a respectively communicate with the center through hole 12 of the body 10 and the channel 3a of the tool 3. During the processing process, with this configuration, water or cutting fluid can be provided into the tool 3 to flush away the metal debris and dust, to lower the temperature of the tool 3 and the workpiece, and further to provide a lubrication effect. Additionally, the channel 20a could be utilized to proceed a negative pressure suction process, or an injection of a high-pressure gas to remove the metal debris and dust produced in the processing process so as to prevent the metal debris from being tangled back to the tool 3 and affecting the precision of the processing, thereby ensuring the stability and reliability of the processing quality of the workpiece.

Furthermore, as shown in FIG. 4, in the current embodiment, the machining toolholder 100 further includes two sealing members 28 disposed on the horn 20. Each of the two sealing members 28 abuts against the surface of the first hole section 121 and the surface of the first section 22 so that the possibility of gas leak or fluid leak from the channel 20a could be avoided.

The piezoelectric actuator 32 and the counter weight part 34 fit around the first section 22 of the horn 20, and are both disposed in the stepping section 122 of the center through hole 12 formed within the body 10. Wherein, the piezoelectric actuator 32 is interposed between the counter weight part 34 and the second section 24 of the horn 20, and is controllable to drive the tool 3 to vibrate. When the piezoelectric actuator 32 vibrates, a resonance node of the horn 20 would be formed at the joint between the first section 22 and the body 10. Since the resonance node has a minimum displacement, the problems with the joint having abrasion or deformation resulted from the friction force or the elevated temperature could be avoided. Meanwhile, it also could prevent the stability of the connection between the horn 20 and the body 10 from being affected by the vibration of the piezoelectric actuator 32, and could avoid the indirect transmission of the vibration from the body 10 to the spindle 1, which could cause a ceramic bearing (not shown) installed on the spindle 1 to be damaged by the external force.

The induction module 40 is electrically connected to the piezoelectric actuator 32, and includes a primary coil 42, a secondary coil 44, and a saddle 46. The primary coil 42 is engaged with the body 10, and is adapted to rotate with the body 10. The primary coil 42 includes a sleeve 421, a first ferrite core 422 and a first coil assembly 423. Wherein, the sleeve 421 is engaged with the body 10; the first ferrite core 422 is adapted to fit around an outside of the sleeve 421; the first coil assembly 423 detachably fit around the first ferrite core 422.

Wherein, a cross-section of the first ferrite core 422 is a symmetrical L-shape, wherein an overall structure of the first ferrite core 422 is simple and compact, and the first ferrite core 422 is produced by powder metallurgy with a ceramic material, without additional processing. In this way, the producing time of the first ferrite core 422 could be shortened, cutting manufacturing cost. In addition, the number of internal porosity formed in the first ferrite core 422 during the process of die-casting could be reduced, whereby the first ferrite core 422 would be less likely to break.

The saddle 46 is made of a material with low permitability, wherein an end of the saddle 46 is fixed on the spindle 1. A recess 461 is recessed into a lateral surface of the saddle 46. The secondary coil 44 is electrically connected to a power (not shown) and is disposed in the recess 461 of the saddle 46 to be fixed in a position close to the primary coil 42 without contacting with the primary coil 10. The secondary coil 44 includes a second ferrite core 441 and a secondary coil assembly 442 fit around the second ferrite core 441.

The induction module 40 could generate an electrical energy by a non-contact electromagnetic induction between the primary coil 42 and the secondary coil 44, whereby to supply the electrical energy to the piezoelectric actuator 20. In this way, the tool 3 could be driven by the piezoelectric actuator 20 to cut in a vibration mode.

Figure 6:
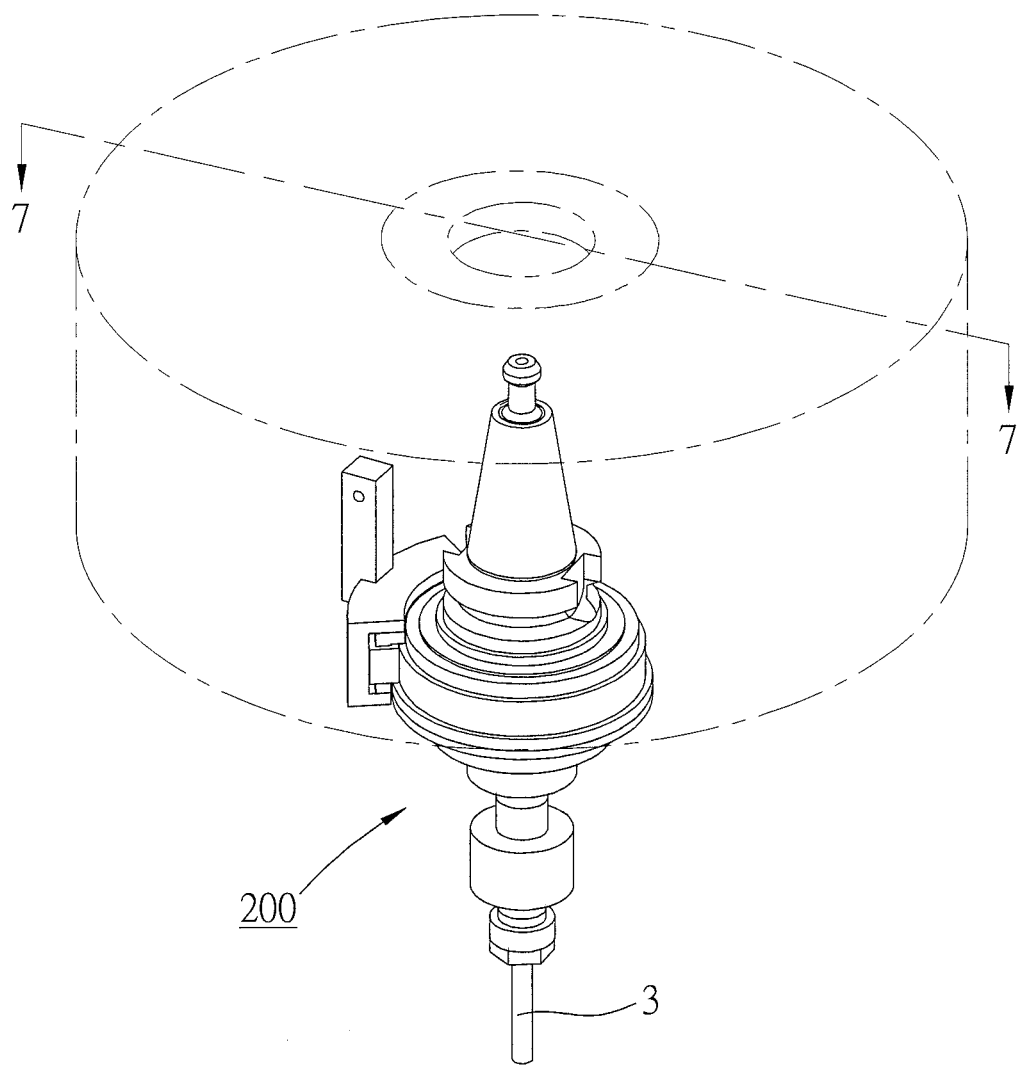
FIG. 6 is a perspective view of a machining toolholder of a second embodiment according to the present invention.
Figure 7:
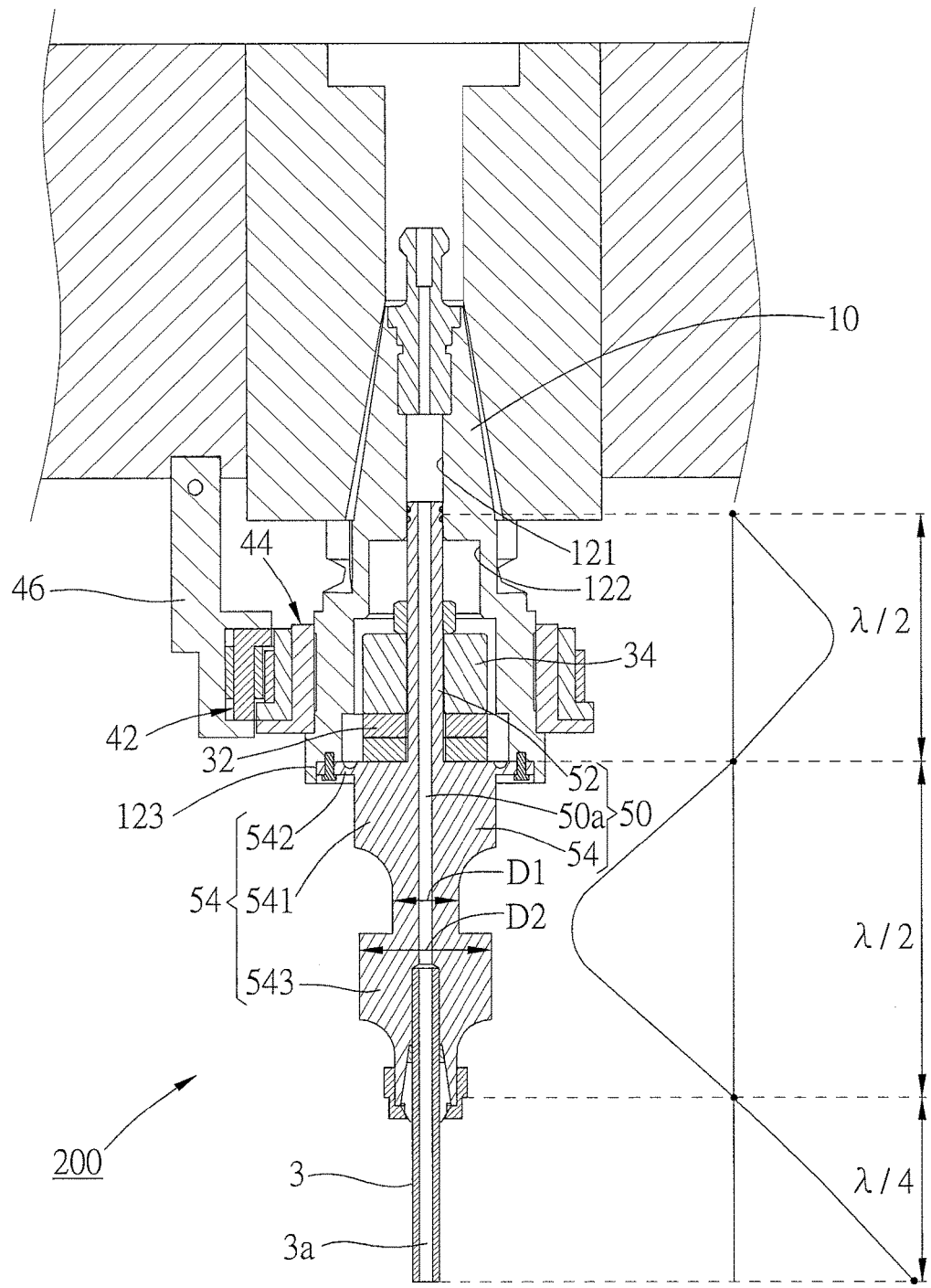
FIG. 7 is a sectional view along the line 7-7 of FIG. 6, showing the relations of the components of the machining toolholder.

As shown in FIG. 6 and FIG. 7, a machining toolholder 200 with high efficiency and high stiffness of a second embodiment according to the present invention is disclosed. The machining toolholder 200 includes a horn 50, and the components similar to those of the first embodiment, including a body 10, a piezoelectric actuator 32, a counter weight part 34 and an induction module 40 having a primary coil 42, a secondary coil 44 and a saddle 46. The body 10 includes a center through hole 12 having a first hole section 121, a stepping section 122 and a second hole section 123. In the current embodiment, the horn 50 is a two-stage amplifier, while the horn 20 of the first embodiment is a one-stage amplifier.

The horn 50 is partially disposed in the center through hole 12. Wherein, a first section 52 of the horn 50 is inserted into the first hole section 121 in a slidable manner. The piezoelectric actuator 32 and the counter weight part 34 fit around the first section 52. The piezoelectric actuator 32 is electrically connected to the induction module 40 and could be driven to vibrate by the piezoelectric actuator 32. A second section 54 of the horn 50 includes a first vibration amplitude-amplifying part 541, a flange 542, and a second vibration amplitude-amplifying part 543. The flange 542 is extended outwardly from the outer surface of the first vibration amplitude-amplifying part 541 in a radial direction. One end of the second vibration amplitude-amplifying part 543 is connected to the first vibration amplitude-amplifying part 541, and the other end of the second vibration amplitude-amplifying part 543 is engaged with the tool 3. The outer surfaces of the first vibration amplitude-amplifying part 541 and the second vibration amplitude-amplifying part 543 are tapering toward the end to be engaged with the tool 3, and a bottom width D1 of the first vibration amplitude-amplifying part 541 is smaller than a top width D2 of the second vibration amplitude-amplifying part 543 such that the cross-sectional areas of the horn 50 are changed in the axial direction, whereby the vibration amplitude could be amplified.

It is worth mentioning that the joint between the tool 3 and the second vibration amplitude-amplifying part 543 of the horn 50, and the joint between the body 10 and the first section 52 of the horn 50 are resonance nodes of the horn 50 which have a minimum displacement. In this way, it could prevent the joints from being generated with abrasion or deformation by the friction force or the elevated temperature. It also could prevent the stability of the connection between the horn 50 and the body 10 from being affected by the vibration of the piezoelectric actuator 32 and could avoid the indirect transmission of the vibration from the body 10 to the spindle 1, which could cause a ceramic bearing (not shown) installed on the spindle 1 to break.

Furthermore, in the current embodiment, the vibration antinode of the horn 50 which has a maximum displacement is located at the processing end of the tool 3, so that the machining toolholder 200 could be operated with a high vibration amplitude. Especially in dealing with the metal material and the composite material having high toughness and high strength, an effective grinding process could be realized.

It must be pointed out that the embodiments described above are only some embodiments of the present invention. All equivalent structures which employ the concepts disclosed in this specification and the appended claims should fall within the scope of the present invention.

What is claimed is:

1. A machining toolholder, adapted to be engaged with a tool, wherein the machining toolholder is provided on a spindle and is driven by the spindle to rotate, the machining toolholder comprising:
   a body, comprising a center through hole extended along an axial direction therein;
   a horn, comprising a first section and a second section, wherein the first section and the second section are disposed coaxially and connected with each other; the first section is partially inserted into the center through hole; the second section is connected to the body and engaged with the tool and the first section is slidably engaged with the body; and
   a piezoelectric actuator, adapted to be fit around the horn and controllable to drive the tool to vibrate;
   wherein an outer peripheral surface of the first section is directly and slidably coupled to an inner surface of the center through hole, and an outer peripheral surface of the second section is fixed to the inner surface of the center through hole;

wherein the second section comprises a first vibration amplitude-amplifying part and a flange; the first vibration amplitude-amplifying part is engaged with the tool; the flange is extended outwardly from the outer surface of the first vibration amplitude-amplifying part in a radial direction; the center through hole comprises a first hole section and a second hole section; part of the first section is inserted into the first hole section and is directly and slidably coupled to the first hole section, and the flange of the second section abuts against a wall surface of the second hole section; a first resonance node of the horn is formed at a joint between the first section and the body when the piezoelectric actuator vibrates, wherein the first resonance node has a minimum displacement; a second resonance node of the horn is formed at a joint between the second section and the body when the piezoelectric actuator vibrates, wherein the second resonance node has a minimum displacement.

2. The machining toolholder of claim 1, wherein the flange of the second section comprises a deformation part for generating a flexural deformation when the horn vibrates.

3. The machining toolholder of claim 2, wherein the deformation part is located between one end of the flange abutting against the wall surface of the second hole section and the other end of the flange connected with the first vibration amplitude-amplifying part.

4. The machining toolholder of claim 3, wherein the deformation part comprises a ring-shaped groove recessed from a top surface or a bottom surface of the flange.

5. The machining toolholder of claim 1, wherein an outer surface of the first vibration amplitude-amplifying part is tapering toward the end to be engaged with the tool.

6. The machining toolholder of claim 1, wherein the second section comprises a second vibration amplitude-amplifying part; one end of the second vibration amplitude-amplifying part is connected to the first vibration amplitude-amplifying part, and the first vibration amplitude-amplifying part is engaged with the tool via the second vibration amplitude-amplifying part.

7. The machining toolholder of claim 6, wherein the outer surfaces of the first vibration amplitude-amplifying part and the second vibration amplitude-amplifying part are tapering toward the end to be engaged with the tool.

8. The machining toolholder of claim 7, wherein a minimum displacement of the horn is at a joint between the second vibration amplitude-amplifying part of the horn and the tool, while a maximum displacement of the horn is at a processing end of the tool.

9. The machining toolholder of claim 8, wherein a bottom width of the first vibration amplitude-amplifying part is smaller than a top width of the second vibration amplitude-amplifying part.

10. The machining toolholder of claim 1, wherein the tool comprises a channel axially disposed therein; the horn comprises a channel extending from the first section to the second section in the axial direction, and the channel of the horn communicates with the center through hole of the body and the channel of the tool.

11. The machining toolholder of claim 1, further comprising at least one sealing member disposed on the horn, the sealing member abuts against a wall surface of the first hole section and a surface of the first section.

* * * * *